United States Patent [19]
Seong

[11] Patent Number: 5,771,160
[45] Date of Patent: Jun. 23, 1998

[54] MULTI-OUTPUT SWITCHING REGULATOR HAVING CONTROLLED TIMING OF BOOST CONVERTOR, INVERTER AND FLYBACK TYPE OUTPUTS

[75] Inventor: Hwan-Ho Seong, Shiheung-city, Rep. of Korea

[73] Assignee: Samsung Electronics Co., Ltd., Suwon-city, Rep. of Korea

[21] Appl. No.: 768,698

[22] Filed: Dec. 18, 1996

[30] Foreign Application Priority Data

Dec. 28, 1995 [KR] Rep. of Korea ................. 95-61332

[51] Int. Cl.$^6$ .......................................... H02M 3/335
[52] U.S. Cl. ............................ 363/20; 363/89
[58] Field of Search .................. 363/15, 16, 20, 363/21, 34, 37, 70, 89

[56] References Cited

U.S. PATENT DOCUMENTS

| | | | |
|---|---|---|---|
| 4,455,596 | 6/1984 | Baker | 363/21 |
| 4,833,582 | 5/1989 | Kupka | 363/21 |
| 5,258,901 | 11/1993 | Fraidlin | 363/15 |
| 5,461,301 | 10/1995 | Troung | 363/16 |
| 5,568,041 | 10/1996 | Hesterman | 363/89 |
| 5,598,326 | 1/1997 | Liv et al. | 363/34 |
| 5,636,108 | 6/1997 | Taurand | 363/20 |

Primary Examiner—Jeffrey L. Sterrett
Attorney, Agent, or Firm—Jones & Volentine, L.L.P.

[57] ABSTRACT

A multi-output switching regulator includes a rectifier circuit portion for converting an alternating current into a direct current, a boost converter portion for boost-converting the direct current, an inverter portion for storing the output from the boost converter portion in a primary winding of a transformer and transferring the stored energy to a secondary winding, a fly-back type first constant voltage output portion for outputting energy transferred to a first secondary winding of the transformer as a first constant voltage and for storing the first constant voltage in an equivalent flux inductance of the transformer and transferring the stored energy to a second secondary winding, and a second constant voltage output portion for outputting energy transferred to the second secondary winding of the transformer as a second constant voltage. Input power factor correction is achieved as well as the outputting of two constant voltages.

5 Claims, 2 Drawing Sheets

FIG. 2A  Q1
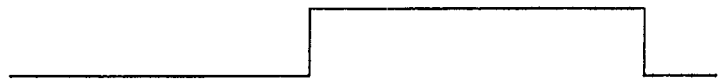
FIG. 2B  Q2
FIG. 2C  Q3
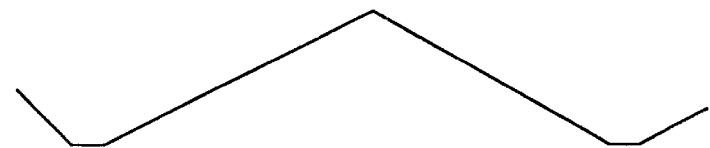
FIG. 2D  $I_{LB}$
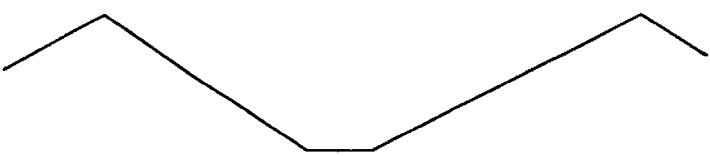
FIG. 2E  $I_{LM}$
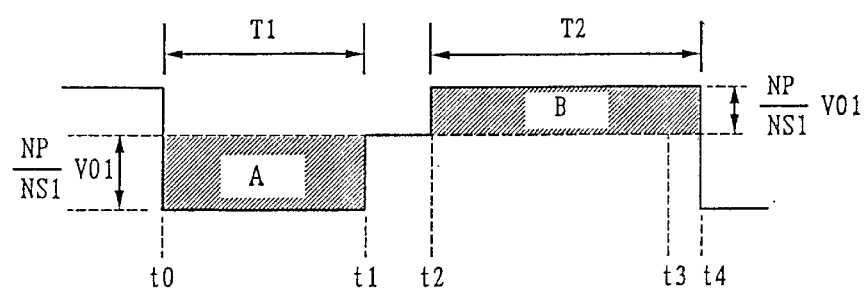
FIG. 2F  $V_{TX}$

MULTI-OUTPUT SWITCHING REGULATOR HAVING CONTROLLED TIMING OF BOOST CONVERTOR, INVERTER AND FLYBACK TYPE OUTPUTS

BACKGROUND OF THE INVENTION

1. Field of the Invention

The present invention relates to a switching regulator, and more particularly, to a multi-output switching regulator which outputs two constant voltages.

2. Description of the Prior Art

Research in the area of power factor correction (PFC) has been recently active as interest in power factor regulation has increased in many countries. Such research has been carried out with respect to various methods, including, for example, a switching method using a boost converter, a method using a choke inductor, and a method which uses only one switch.

From a structural viewpoint, it is generally difficult to electrically insulate the boost converter. Also, use of a transformer is considered complicated since at least two switches should be employed and an output port should adopt a two-wave rectifier circuit.

The power requirements of an electronic apparatus may permit a small ripple voltage to be included in the output voltage, or may require an output voltage without ripple.

In the boost converter, when an input current is controlled to have the same shape as that of an input voltage for the PFC, an output voltage thereof comes to have a ripple voltage of a frequency corresponding to twice a main power frequency. For example, if the main power frequency is 60 Hz, the ripple voltage frequency is 120 Hz.

Also, in a general multi-output converter, each of the multiple outputs depends on a turn ratio of a transformer. In this case, it is difficult to simultaneously make constant the voltages of the multiple outputs due to output current or leakage inductance of the transformer.

SUMMARY OF THE INVENTION

To solve the drawbacks of the related art, it is an object of the present invention to provide a multi-output switching regulator in which an output of a boost converter is insulated by a transformer and a fly-back converter is overlapped with the transformer, to thereby obtain a power factor correction and two insulated outputs having constant voltages.

To achieve the above object, there is provided a multi-output switching regulator comprising: a rectifier circuit portion for converting alternating current into direct current; a boost converter portion for boost-converting the direct current; an inverter portion for storing an output from the boost converter portion in a primary winding of a transformer and transferring the thus stored energy to a secondary winding; a first fly-back type constant voltage output portion for outputting energy transferred to a first secondary winding of the transformer as a first constant voltage, storing the first constant voltage in an equivalent flux inductance of the transformer, and transferring the stored energy to a second secondary winding; and a second constant voltage output portion for outputting energy transferred to the second secondary winding of the transformer as a second constant voltage.

BRIEF DESCRIPTION OF THE DRAWINGS

The above object and advantages of the present invention will become more apparent by describing in detail a preferred embodiment thereof with reference to the attached drawings in which:

FIG. 2 is a timing diagram illustrating the operation of the multi-output switching regulator according to the present invention.

DETAILED DESCRIPTION OF PREFERRED EMBODIMENTS

Figure 1:
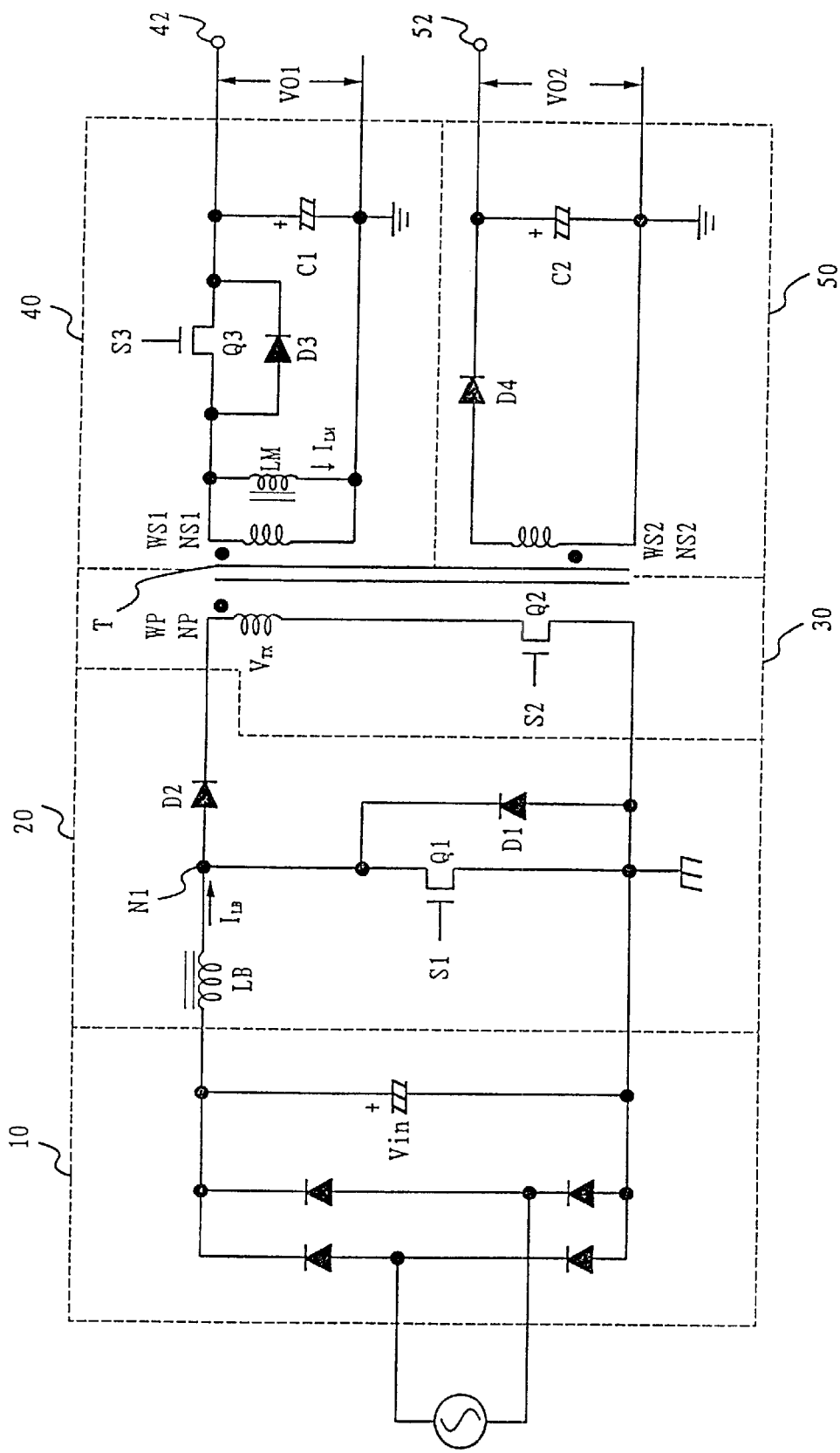
FIG. 1 is a circuit diagram showing the structure of a multi-output switching regulator according to the present invention.

As shown in FIG. 1, a multi-output switching regulator according to the present invention includes a rectifier circuit portion 10 for converting alternating current into direct current; a boost converter portion 20 for boost-converting the direct current; an inverter portion 30 for storing the output from the boost converter portion 20 in a primary winding WP of a transformer T and transferring the stored energy to a secondary winding WS; a fly-back type first constant voltage output portion 40 for outputting energy transferred to a first secondary winding WS1 of the transformer T as a first constant voltage V01, storing the first constant voltage V01 in an equivalent flux inductance LM of the transformer T, and transferring the stored energy to a second secondary winding WS2; and a second constant voltage output portion 50 for outputting energy transferred to the second secondary winding WS2 of the transformer T as a second constant voltage V02.

The boost converter portion 20 includes an inductor LB connected between the output port of the rectifier circuit portion 10 and a first node N1; a first switching transistor Q1 connected between the first node N1 and a ground, for driving the inductor LB; a first diode D1 connected in a reverse bias between the first node N1 and a ground; and a second diode D2 connected in a forward bias between the first node N1 and one end of the primary winding WP of the transformer T.

The inverter portion 30 includes a second switching transistor Q2 connected between the other end of the primary winding WP of the transformer T and a ground. The second switching transistor turns on in a turn-off interval of the first switching transistor Q1, and the turn-on interval of the second switching transistor Q2 is partially overlapped with the turn-on interval of the first switching transistor Q1 as shown in FIGS. 2A and 2B.

The first constant voltage output portion 40 includes a third diode D3 forwardly biased between one end of the first secondary winding WS1 of the transformer T and a first output port 42; a third switching transistor Q3 is also connected between one end of the first secondary winding WS1 of the transformer T and the first output port 42, which turns on and off in reverse phase relative to the turn-on and turn off intervals of the first switching transistor Q1 as shown in FIG. 2C; and a first capacitor C1 connected between the first output port 42 and a ground.

The second constant voltage output portion 50 includes a fourth diode D4 forwardly biased between one end of the second secondary winding WS2 of the transformer T and a second output port 52, and a second capacitor C2 connected between the second output port 52 and a ground.

According to the multi-output switching regulator of the present invention, while the voltage $V_{TX}$ accross the transformer T is maintained to a negative value whose modulus is the same as a turn ratio NP/NS2 associated with the second output port voltage V02, and then to a zero voltage, an inductance voltage $I_{LB}$ increases to a value corresponding to the ratio of inductance LB to a voltage accross a capacitor $C_{IN}$. While the inductance current IB increases, the inductance current $I_{LB}$ left in the flux inductance LM is electromagnetically transferred to the second constant voltage output portion 50 by the winding WS2 and then is stored as a predetermined voltage. Also, while the voltage $V_{TX}$ accross the transformer T is maintained as a value which is the same as a turn ratio associated with the first output port voltage V01, the inductance voltage $I_{LB}$ is transferred to the first constant voltage output portion 40 by the winding WS1 and then is stored therein as a predetermined voltage.

The operation and effects of the multi-output switching regulator having the above structure will be described as below.

As shown in FIG. 1, assuming an ideal transformer T which releases the output of the boost converter portion 20 to the fly-back type first constant voltage output portion 40, the circuit operation could be smoothly performed without use of the second and third transistors Q2 and Q3. However, since the transformer T is not ideal, the voltage $V_{TX}$ accross the transformer T should be controlled to have an average of a zero voltage, as shown in FIG. 2F.

In the waveform shown in FIG. 2F, time interval t0 to t2 is a turn-on interval of the first switching transistor Q1 of the boost converter portion 20, and time interval t2 to t4 is a turn-off interval thereof.

If the turn-on interval of the first switching transistor Q1 is maintained for a period of 60 Hz, and the voltage $V_{TX}$ accross the transformer T is determined for the inductance current $I_{LB}$ to be zero again (here, the boost converter circuit operates in a discontinuous mode) within a switching period as shown in FIG. 2D, current input to the boost converter portion 20 comes to have a shape which is nearly the same as that of the input voltage. As a result, a power factor exceeding 0.9 is obtained, and thus power factor correction is achieved.

Next, a process by which a constant voltage is obtained for the two output voltages V01 and V02 will be described with reference to FIGS. 1 and 2.

First, as shown in FIG. 2A, when the first switching transistor Q1 turns on at time to, a predetermined inductance current $I_{LM}$ flows in the flux inductance LM of the first constant voltage output portion 40. Here, the second and third switching transistors Q2 and Q3 are turned off at time t0 as shown in FIGS. 2B and 2C.

As above, when the first switching transistor Q1 turns on, inductance current $I_{LB}$ in the inductance LB starts to increase from zero at a slope corresponding to the inductance LB to an input voltage $V_{IN}$. Also, the flux inductance current $I_{LM}$ is released from the flux inductance LM to the second output port 52 via the windings WS1 and WS2.

Here, as an inverse voltage is applied to the flux inductance LM, the flux inductance current $I_{LM}$ decreases as shown in FIG. 2E and the voltage $V_{TX}$ accross the transformer T becomes–(NP/NS2)·V02.

Also, when the second switching transistor Q2 turns on at time t1 while transistor Q1 remains turned on, the flux inductance current $I_{LM}$ is released via the first secondary winding WS1 and the primary winding WP of the transformer T and then flows through the first and second switching transistors Q1 and Q2 or through the first and second diodes D1 and D2. If a voltage drop at the first and second switching transistors Q1 and Q2 is disregarded, the voltage $V_{TX}$ accross the transformer T becomes zero as shown in FIG. 2F. Here, the flux inductance current $I_{LM}$ is maintained as a predetermined value as shown in FIG. 2E.

In addition, as shown in FIGS. 2A to 2C, when the first switching transistor Q1 turns off at time t1, and the third switching transistor Q3 turns on while the second switching transistor Q2 remains on, the inductance current $I_{LB}$ is released to the primary winding WP of the transformer T via the second diode D2, to the first secondary winding WS1 of the transformer T via the first switching transistor Q1, and to the first output port 42 via the third switching transistor Q3 and the third diode D3.

Here, the voltage $V_{TX}$ accross the transformer T becomes (NP/NS1)·V01 and the flux inductance current $I_{LM}$ starts to increase as shown in FIG. 2E. On the contrary, the inductance current $I_{LB}$ decreases with a slope of $(V_{TX}-V_{IN})/LB$.

As shown in FIG. 2E, the flux inductance current $I_{LM}$ is controlled to be above zero. Also, if the flux inductance current $I_{LM}$ is the same at the turn-on interval t1–t2 and turn-off interval t2–t4 during a normal state, the average of the voltage $V_{TX}$ applied to the primary winding WP of the transformer T becomes zero. Thus, areas of two hatched-portions A and B shown in FIG. 2F become equal. That is:

$T1(NP/NS2) \cdot V02 = T2(NP/NS1) \cdot V01$ $V02/V01 = (NS2/NS1) \cdot (T2/T1)$ As described above, if the change of the turn-on interval t0–t2 is not severe, that is, if the inductance current $I_{LB}$ decrease to zero and an interval T2 is not substantially changed, the output voltage V02 of the second constant voltage output portion 50 can be processed as a constant voltage by controlling an interval T1.

Also, the output voltage V01 of the first constant voltage output portion 40 can be processed as a constant voltage by controlling the turn-on interval t0–t2 of the first switching transistor Q1.

Here, the turn-on/turn-off interval of the first switching transistor Q1 is constantly controlled in a period of 60 Hz for the correction of the input power factor, so that a relatively substantial ripple of 120 Hz occurs in the output voltage V01 of the first constant voltage output portion 40.

Also, the output voltage V02 of the second constant voltage output portion 50 is accurately processed as a constant voltage by the output voltage V01 of the first constant voltage output portion 40.

Therefore, according to the multi-output switching regulator of the present invention, the output of the boost converter can be insulated by the transformer.

Also, a fly-back converter is overlapped with the transformer, thereby resulting in power factor correction and two insulated output voltages having constant values.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A multi-output switching regulator comprising:
   a rectifier circuit portion for converting an alternating current into a direct current;
   a boost convertor portion for boost-converting the direct current when said boost convertor is active, said boost convertor including a first switch for activating said boost convertor during each boost convertor on-interval of each operational cycle and for deactivating said boost convertor during each boost convertor off-interval of each said operation cycle;

an inverter portion, including a transformer having a primary winding and at least two secondary windings, for storing an output from said boost converter portion in the primary winding of said transformer and transferring the thus stored energy to at least one secondary winding of said transformer when said invertor portion is active, said invertor portion including a second switch for activating said inverter portion during each inverter portion on-interval of each said operational cycle and for deactivating said invertor portion during each inverter portion off-interval of each said operation cycle;

a fly-back type first constant voltage output portion for outputting energy transferred to a first secondary winding of said transformer as a first constant voltage, storing the first constant voltage in an equivalent flux inductance of said transformer, and transferring the thus stored energy to a second secondary winding of said transformer when said first constant voltage output portion is active, said first constant voltage output portion including a third switch for activating said first constant voltage output portion during each output portion on-interval of each said operational cycle and for deactivating said first constant voltage output portion during each output portion off-interval of each said operation cycle; and a second constant voltage output portion for outputting energy transferred to said second secondary winding of said transformer as a second constant voltage, wherein said boost convertor on-interval precedes said boost convertor off-interval within each said operation cycle, wherein the output portion on-interval and off-interval are during the boost converter off-interval and on-interval, respectively, and wherein said inverter portion off-interval and said output portion off-interval precede said inverter portion on-interval and said output portion on-interval, respectively, within each said operational cycle, and wherein said boost convertor on-interval overlaps said inverter portion on-interval within each said operational cycle.

2. A multi-output switching regulator as claimed in claim 1, wherein said boost converter portion comprises:

an inductor connected between an output port of said rectifier portion and a first node;

a first switching transistor, connected between said first node and a first ground, for driving said inductor, and constituting said first switch;

a first diode reversely biased between said first node and the first ground; and a second diode forwardly biased between said first node and one end of said primary winding of said transformer.

3. A multi-output switching regulator as claimed in claim 2, wherein said inverter portion comprises a second switching transistor connected between the other end of said primary winding of said transformer and said first ground said second switching transistor constituting said second switch.

4. A multi-output switching regulator as claimed in claim 3, wherein said first constant voltage output portion comprises:

a third diode forwardly biased between one end of the first secondary winding of said transformer and a first output port;

a third switching transistor connected between said one end of the first secondary winding of said transformer and said first output port, said third switching transistor constituting said third switch; and a first capacitor connected between said first output port and a second ground.

5. A multi-output switching regulator as claimed in claim 4, wherein said second constant voltage output portion comprises:

a fourth diode forwardly biased between one end of said second secondary winding of said transformer and a second output port; and a second capacitor connected between said second output port and said second ground.

* * * * *